United States Patent [19]

Knoblauch et al.

[11] 4,406,674

[45] Sep. 27, 1983

[54] METHOD FOR SEPARATING GAS MIXTURES BY MEANS OF A PRESSURE CHANGING TECHNIQUE

[75] Inventors: Karl Knoblauch; Ekkehard Richter, both of Essen; Klaus Giessler, Gelsenkirchen; Werner Körbächer, Mühlheim, all of Fed. Rep. of Germany

[73] Assignee: Bergwerksverband GmbH, Essen, Fed. Rep. of Germany

[21] Appl. No.: 384,156

[22] Filed: Jun. 1, 1982

[30] Foreign Application Priority Data

Jun. 6, 1981 [DE] Fed. Rep. of Germany ....... 3122701

[51] Int. Cl.³ ............................................. B01D 53/04
[52] U.S. Cl. ......................................... 55/25; 55/58; 55/62; 55/68; 55/75
[58] Field of Search .................. 55/25, 26, 31, 34, 33, 55/57, 58, 59, 62, 68, 74, 75

[56] References Cited

U.S. PATENT DOCUMENTS

| 3,226,913 | 1/1966 | Avery | 55/25 |
|---|---|---|---|
| 3,252,268 | 5/1966 | Stark | 55/25 |
| 4,021,210 | 5/1977 | Staeich | 55/62 |
| 4,070,164 | 1/1978 | Miwa | 55/58 |
| 4,077,779 | 3/1978 | Sircar | 55/62 |
| 4,153,428 | 5/1979 | Saunders | 55/62 |
| 4,171,207 | 10/1979 | Sircar | 55/26 |
| 4,299,596 | 11/1981 | Benkman | 55/62 |
| 4,315,759 | 2/1982 | Benkman | 55/25 |
| 4,350,500 | 9/1982 | Esselink | 55/58 |
| 4,371,380 | 2/1983 | Benkman | 55/26 |

FOREIGN PATENT DOCUMENTS 2460513 7/1976 Fed. Rep. of Germany ......... 55/25

Primary Examiner—Ernest G. Therkorn
Attorney, Agent, or Firm—Michael J. Striker

[57] ABSTRACT

Method for separating gas mixtures resulting from direct flow loading of adsorption reactors by means of a pressure change technique in a two stage adsorption reactor consisting of a prefilter and a separating filter, whereby strongly adsorbable impurities from the gas mixture are adsorbed in the prefilter and the remainder of the undesirable gas components are adsorbed in the separating reactor. Thereby, product gas flows off at the end of the separating reactor shortly before the passage therethrough of a non-desirable gas component. Thereafter, the prefilter and the separating reactor are disconnected and the prefilter is partially relieved by a gas counter flow and the separating reactor is partially relieved by direct gas flow. After reconnection of prefilter and separating reactor the unit is further released in the counter current, subsequently rinsed and is again brought to charge pressure in the direct or counter current. The prefilter can be prerinsed before the gas like reconnection with the separating reactor. During rinsing and pressure build up one can use relieve gas. Preferably, four coupled two stage adsorption reactors are used as well as an additional prefilter.

8 Claims, 1 Drawing Figure

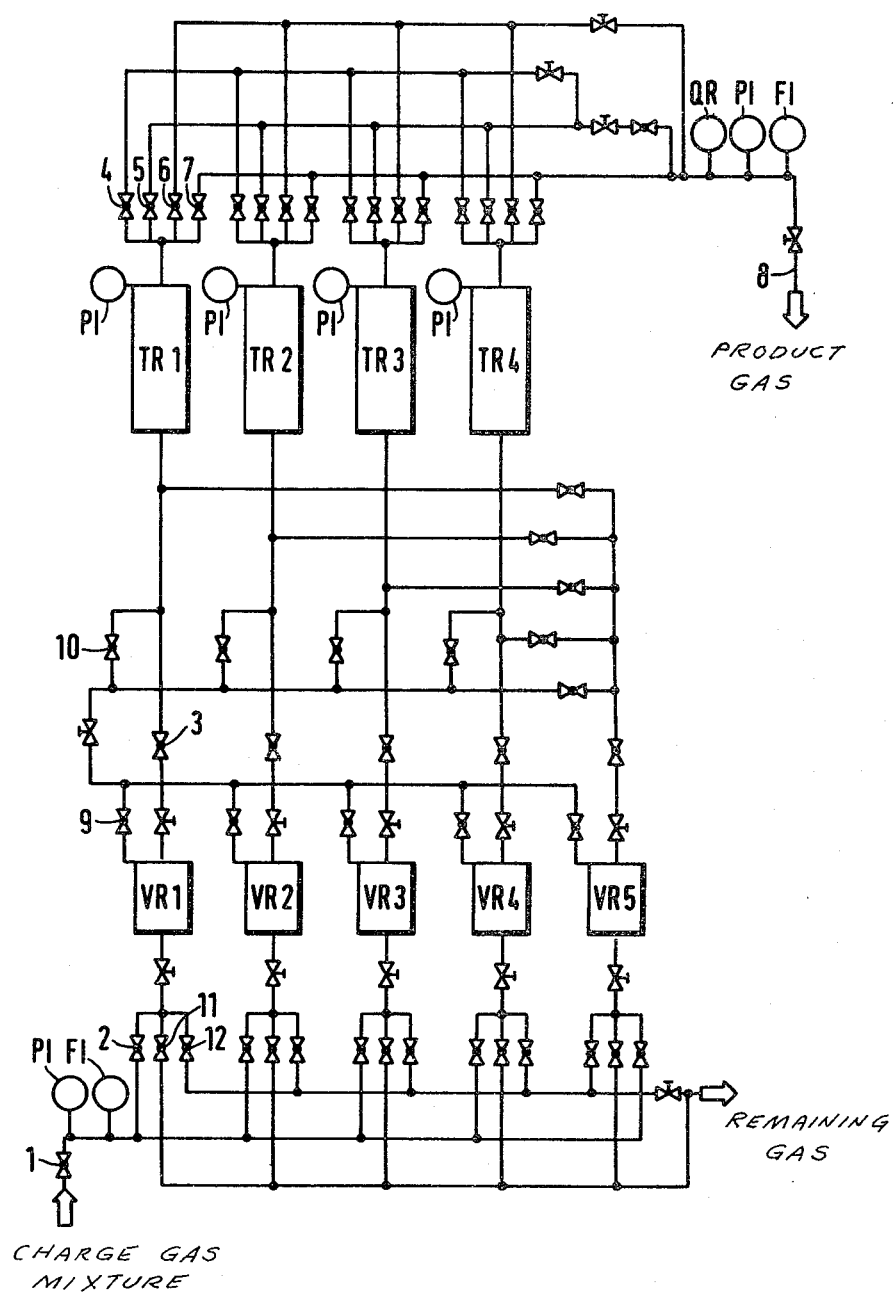

METHOD FOR SEPARATING GAS MIXTURES BY MEANS OF A PRESSURE CHANGING TECHNIQUE

The invention relates to a method for separating gas mixtures by means of a pressure change procedure in a two stage adsorption reactor consisting of a prefilter and a separating reactor.

When separating such gas mixtures which consists of at least three components by means of the pressure change technique it is usual to use a prefilter in the adsorption reactor, for example, filled with adsorption agents, so as to remove such components from the charge mixture which adsorb very strongly on the adsorption agents. These include, among others, higher hydrocarbons, aromates, naphtenes, but also water vapor and other gases. The prefilter technique assures that the actual separating reactor which is filled with an adsorption agent can be used for an almost unlimited time before the adsorption agent is contaminated in an unacceptable manner. Such a manner is used in the DE-OS No. 27 29 538. Typical product gases are practically not absorbed, or inconsequentially with respect to the other gas components, for example, $H_2$, He, and others. The yield of the gas components to be recovered is limited in that relatively large quantities of product gas which for example could be more than 15% of the product gas have to be used for rinsing purposes, this is particularly true, when relatively strong adsorbed gas components have to be removed during the adsorber regeneration (desorption) by means of rinsing.

It is an object of the invention in further improving the service life of the adsorption agent in particular the prefilter and in increasing the yield of product gas. To this end, the desorption final pressure should be at atmospheric pressure, or, if possible slightly thereabove.

The solution of the mentioned object is obtained in a method of the aforementioned type by the characterizing features of claim 1. This solution is based on the basic idea of carry out the regeneration of the adsorption agent of the prefilter and the separating reaction in different ways and to provide a practical rinsing stage wherein at least the prefilter is not rinsed with a pure product gas, but with such a gas containing a higher content of easy desorbable gas components, that is, poorer adsorbable gas components than the gas mixture to be rinsed free. In this manner, the loss of product gas component for rinsing purposes can be reduced by up to 50%. Typically, relief gas or inexpensive foreign gas with the aforementioned characteristics is used, whereby the excellent thorough rinse effect of the relieve gas is surprising. The finish of the adsorption should be preferably carried out when neither the gas components to be adsorbed in the prefilter nor in the separating reactor, or respectively, one of these gas components are to pass through at the given end (of prefilter or separating reactor). Such a design of prefilter and separating reactor would be at an optimum, when the gas would simultaneously pass through both. This would be true for only one gas composition. Consequently, it is possible to simultaneously run the relief phases in the prefilter and the separating reactor; however, as will be explained later it may be advantageous to at first carry out the relaxation of the prefilter and thereafter to carry out the relief or partial relief of the separating reactor thus preferably using the latter relief gas for the prefilter rinsing.

Further embodiments of the invention and particular solutions can be seen from the subclaims.

The two stage adsorption reactor may consist of separate but also single containers, whereby the prefilter (1.stage) and the separating reactor (2.stage) can be disconnected and gas feeding and discharging lines are provided at the ends of the given stages in such a manner that they can be generated in the direct or counter flow in an inventive manner. In the case of the application of the invention in only a two stage adsorption reactor it is recommended to provide gas intermediary storage containers in accordance with the method steps of the claims.

Adsorption agents are principally suitable which heretofore were used in this field of the invention, like active carbons, carbon molecular sieves, zeolites, etc.; in particular it is recommended that different adsorption materials be used in the prefilter and separation reactor.

The pressure and temperature conditions are within the framework of the condition usually prevailing in this field of invention.

It had been shown that the mode of operation in accordance with numbers 2.1 to 2.5 of claim 1 in conjunction with the other substantially known features from claim 1 substantially improves the service life of the prefilter and simultaneously increases the yield of product gas with respect to the known method step.

In particular the rinsing step in accordance with claim 2 has been shown to be advantageous, whereby the specific counter flow rinsing of the prefilter can occur subsequent to the partial counter flow release (stage 2,3 of claim 1) as well as parallel thereto, whereby the relieving effect in subsequent method steps is partially effective, while the parallel performance of these stages are advantageous for the time plan of the operating performance.

Advantageous for the product gas yield are further the mode of operations in accordance with claims 3 and/or 4. Thereby, it is surprising that the rinsing effect is usually as good as if pure product gas would be used. It can be advantageous to carry out a further conclusive rinsing phase with pure product gas in the counter flow. In addition, the relieve gases are effective in the same manner during the pressure build up in the counter current in accordance with claim 4 for pushing back the contamination fronts in the adsorption agent layer, as is the case during the pressure build up with pure product gas.

Depending on the quantity of recovered relief gas from the direct current relieve of the separating reactor it may be desirable to carry out the pressure build up in accordance with claim 5, partially with product gas, whereby it is recommended to carry out the pressure build up in two phases, whereby in the first phase direct flow relief gases are used and that product gas is used in the second phase.

Depending on the composition of the charge gas mixture and the required quality of the product gas, it can be useful to use a direct flow in the charge gas mixture during the pressure build up, thereby the charge gas mixture is used for the last pressure build up in case of a multi stage pressure build up.

The inventive method can be perform particularly effectively if, in accordance with claim 7, at least four of the two stage adsorption reactors are used. In addition, a further prefilter may be used, so that the total installation does not have to be put out of action when of the prefilters must be regenerated or replaced after contamination. By the measures of claim 8, a surprisingly high rinsing efficiency is obtained for the separating reactor in a later occuring first rinsing step, so that product gas is saved for this purpose.

By the measures of claim 9 the composition of the first relief gas is improved to a product gas quality which increases the production yield, since further product gas for the remaining rinsing and/or remaining pressure build up purposes is now available.

It is emphasized that with the invention method gas mixtures as product gas are to be understood, although in the most frequent application cases the product gas consists of one single component.

Further objects, features, advantages and application possibilities of the subject invention are apparent from the following description of an illustrative embodiment in light of the attached drawing. Thereby, all described and/or illustrated features alone or in a given sensible combination suggest the subject matter of the subject invention, even independent from their abstract in the claims or the reference made thereto.

The drawings show:

FIG. 1 a diagram for four adsorption reactors and a fifth prefilter.

A two stage adsorption reactor thereby consists by means of a prefilter (VR) and a separating filter (TR). The fifth prefilter can be alternately used in case that one of the four remaining prefilters is regenerated or has to be replaced.

The pressure and throughflow quantity is established directly behind the valve 1. The gas connection of the charge gas mixture is established with the individual adsorption reactors of the corresponding valves connected with valve 2. The valves which are associated with valve 3, are used to disconnect the individual prefilters from the separating reactors or to connect the prefilter to the corresponding separating reactor. The valves corresponding to valves 4, 5, 6 and 7 do connect the separating reactors with the main product gas line 8 or 1 to the other adsorption reactors, whereby a separation occurs of direct flow relief gas or product gas of a separating reactor, on the one hand, and to an adsorption reactor for rinsing and, on the other hand, to one or a plurality of other adsorption reactors for a pressure build up. By the valves corresponding to valves 9 and 10 the prefilters can be rinsed by counterflow rinsing gas before the prefilter is reconnected with the adsorption reactor of another adsorption reactor from the rinsing gas therefrom.

The valves which correspond to valves 11 and 12 serve the two different relief stages.

PI designates the pressure measurement, FI the gas quantity measurement and QR the gas concentration measurement.

The valves which are represented by a faucet are used as control valves, while the others have merely an open/closing function. Various examples and comparison test are described in detail below.

EXAMPLE 1

Four two stage adsorption reactors were used. Each consist of a prefilter housing with a height of 340 mm and a diameter of 180 mm as well as a separation reactor with larger housing size of 2510 mm and a diameter of 180 mm.

The separation reactors were each filled with carbon molecular sieves having a charge weight of 660 g/l and the prefilter filled with active carbon with a charge weight of 400 g/l.

A gas mixture had the following composition: 57.3% $H_2$; 25.8% $CH_4$; 7.4% $N_2$; 0.04% $C_3H_6$; 4.5% CO; 1.7% $CO_2$; 1.6% $O_2$; 0.03% $C_4H_8$; 1.2% $C_2H_4$; 0.3% $C_2H_6$; 0.08% $C_4H_{10}$.

The charge pressure was 16 bar, the end pressure after relief was about 1 bar. The temperature was equal to the ambient temperature.

In accordance with the teaching of the claims a product gas mixture containing normal state hydrogen having a purity in excess of 99.9% was obtained from a coking gas charge mixture. The amount of product gas was 16 m³/h and the hydrogen gas yield was 85% of the hydrogen present in the coking gas.

The prefilters had to be regenerated after 5,000 operating hours.

A complete pressure change cycle lasts 20 minutes as follows:

| | |
|---|---|
| adsorption | 300 seconds |
| relief in direct flow of the separating reactor (simultaneous relief and prerinsing of the prefilter) | 254 seconds |
| relief in counter flow | 46 seconds |
| rinsing in counter flow | 300 seconds |
| pressure build up 1 in counter flow | 208 seconds |
| pressure build up 2 in counter flow | 69 seconds |
| pressure build up 3 in counter flow | 23 seconds |

PRIOR ART COMPARISON WITH RESPECT TO EXAMPLE 1

For illustration of the improvements obtained by the invention a test series was conducted with the device of the aforementioned inventive example under the same temperature and pressure conditions as well as the same charge gas mixture, wherein in accordance with the state of the art the prefilter and the separating reactor of each second two stage adsorption reactor was treated in the same manner, i.e., that the prefilters and separating reactors were not disconnected and reconnected consequently a first relief phase is followed by the adsorption phase in direct flow, followed by a second relief phase in counter flow with subsequent counter flow rinsing. The pressure build up was at first conducted in counter flow with relief gas from the direct flow relief phase and subsequently in the direct flow to the charge pressure with the charge gas mixture, whereby the following time intervals were chosen:

| | |
|---|---|
| adsorption | 300 seconds |
| relief in the direct flow | 116 seconds |
| relief in the counter flow | 184 seconds |
| rinsing in the counter flow | 300 seconds |
| pressure build up 1 in the counter flow | 116 seconds |
| pressure build up 2 in the counter flow | 184 seconds |
| 1 cycle | 1,200 seconds |

A complete pressure change cycle took about 20 minutes. Also, a product gas yield of 16 m³/h was obtained of normal state of hydrogen having a purity of 99.9 volume %.

The yield of hydrogen was only 82% and the service life of the prefilters was reduced to 2,300 h.

EXAMPLE 2

This example is conducted using an installation in accordance with FIG. 1. Crude gas flows through valve 1 and 2 through the regenerated adsorber VR 1, which at first is filled with product gas at a product gas pressure. A portion of the gas components is absorbed in VR 1, while the remainder of the gas is fed through the also regenerated adsorber TR 1 by means of valve 3. At the beginning, TR 1 is also filled with product gas to product gas pressure. The purified gas mixture is fed through valve 7 as a product gas into the product gas line 8. The adsorption is finished when the adsorbed gas components have not yet passed through adsorber VR 1 and while the remainder of the components to be adsorbed have not passed through adsorber TR 1. The valves 2, 3 and 7 are at first closed in the following regeneration phase. The gas adsorbed in VR 1 and the gas from the void gas volume is relieved by valve 12 in the remainder gas line. The pressure relief in TR 1 is performed in two phases, in that the first released pressure relief gas, which predominantly consists of product gas and the component to be adsorbed at TR 1, is drawn off in the counter flow with respect to the adsorption direction by means of valve 10 and then is rinsed in adsorber VR 2 in the counter flow and is thereafter released into the remaining gas line. Thereby, the pressure in adsorber TR 1 is reduced from production gas pressure to a pressure between the same and the remainder gas pressure. The enriched adsorption agent which has accumulated in the adsorber VR 2 is rinsed at the remaining gas pressure. This pressure relief phase is closed after a predetermined time. Thereafter, valve 3 is again opened and now the adsorbers TR 1 and VR 1 are commonly relieved in the counter flow up to the remaining gas pressure through the remaining gas line. Thereby, the remainder desorbs from the adsorption agent of VR 1 due to the rinsing effect of the gas components which were adsorbed in TR 1, as well as on account of the further pressure reduction to the remaining gas pressure. After finishing the pressure relieve adsorber TR 1 is at first closed for a short time period from VR 1. During this time adsorber VR 1 is rinsed with the first pressure relief gas from adsorber TR 4 in the counter flow. Thereafter, valves 3 and 6 are opened, so that the product gas rinses both adsorbers consecutively in the counter flow. The rinsing gas is discharged from VR 1 by means of the remainder gas line. The concluding pressure build up of the two adsorbers is carried out commonly in the counter flow with product gas at closed adsorption input of VR 1. Thereafter, the cycle is repeated. During this mode of operation, the consecutively switched adsorbers VR and TR are released at two stages in the counter flow, whereby the pressure relief gas of TR is used in the first phase for the first rinsing phase of another VR-adsorber in the counter current, while in the second phase the pressure relief gas from TR is drawn off in the counter flow from VR, or is relieved, respectively. The rinsing occurs in both adsorbers in the counter flow, whereby TR is merely rinsed with product gas which subsequently is drawn off in the counter flow by VR, thus representing the second rinsing gas; the pressure build up is carried out at one stage in the counter flow with product gas.

Hydrogen is recovered from a crude gas consisting of 60 volume % $H_2$, 1.3 volume-% $CO_2$, 7.0 volume-% $N_2$, 6.2 volume-% CO and 25.7 volume-% CH at a product gas pressure of 17 bar hydrogen with a pressure change installation in the aforementioned operating manner. CO and $N_2$ are predominantly adsorbed in the TR adsorbers, $CH_4$ and $CO_2$ predominantly in the VR-adsorbers. For a volume throughput of 10 m$^3$/h (i.N) (i.N.=normal condition) of the crude gas the adsorbers are designed as follows:

Adsorber TR 1 to 4: with 0.009 m$^3$ adsorption agent volume each

Adsorber VR 1 to 4: with 0.0125 m$^3$ adsorption agent volume each.

All adsorbers are filled with a carbon molecular sieve whose specific surface (defined by Brunauer, Emmett and Teller) is 1.100 m$^2$/g.

When operating this installation 5.12 m$^3$/h (i.N) hydrogen with a purity of 99.9% are produced as product gas during a crude gas throughput of 10 m$^3$/h (i.N). The remaining gas is composed of 2.67 volume-% $CO_2$, 14.34 volume-% $N_2$, 18.03 volume-% $H_2$, 12.30 volume-% Co and 52.66 volume-% $CH_4$. The remainder gas volume is composed of 4.88 m$^3$/h (i.N), and the remainder gas pressure is about 1 bar.

EXAMPLE 3

In this example the regeneration is performed, at the same adsorption as in the prior example, in that the given TR-adsorbers are closed at both sides and that during this time the VR-adsorber is relieved in the counter flow over the remainder gas line. As soon as a predetermined pressure is reached in the VR-adsorber between the crude gas and the remainder gas pressure, the connection between the TR and the VR-adsorber (valve 3) is again reconnected and in the following a pressure relief occurs in the two adsorbers in the counter current until it reaches the remainder gas pressure. At the beginning of this second pressure relief phase of the VR adsorber it is filled with a mixture of product gas and the gas components to be adsorbed from the crude gas. The gas mixture contained at this time in the TR adsorber consists of product gas only and the components to be adsorbed in the TR adsorber. The latter gas mixture has therefore a rinsing effect in the VR-adsorber with respect to the gas components adsorbed therein. Finally, a rinsing stage is performed in that product gas flows through both adsorbers in the counter flow method and is released into the remainder gas line; the following pressure build up is performed as in example 2, in the counter flow with respect to the adsorption direction with a product gas. The following example, in accordance with this mode of operation is carried out on four groups of successive switched VR and TR adsorbers (see FIG. 1), but it could be performed at a given number of such adsorber groups, parallel or alternately thereto.

Hydrogen is generated from the aforementioned described manner from a crude gas consisting of 60 volume-% $H_2$, 1.3 volume-% $CO_2$, 7.0 volume-% $N_2$, 6.0 volume-% and 25.7 volume-% CH at a product gas pressure of 17 bar. CO and $N_2$ are adsorbed substantially in the TR-adsorbers, and $CH_4$ and $CO_2$ exclusively in the VR-adsorbers. The adsorbers are designed as follows for a volume throughput of 10 m$^3$/h (i.N) of crude gas.

Adsorber TR 1 to 4: at 0.009 m$^3$ adsorption agent volume

Adsorber VR 1 to 4: at 0.014 m$^3$ adsorption agent volume adsorption agent as in example 2.

The operation of this installation generated hydrogen with a purity of 99.9% as a product gas with a crude gas throughput of 10 m$^3$/h (i.N) 5.06 m$^3$/h (i.N). The remaining gas is composed of 2.63 volume-% CO$_2$, 14.17 volume-% N$_2$, 19.03 volume-% H$_2$, 12.15 volume-% CH. The remaining gas volume flow is 4.94 m$^3$/h (i.N), the remaining gas pressure about 1 bar.

EXAMPLE 4

In this example the adsorption phase is again performed as in the two preceeding examples. In the regeneration phase the TR adsorber is at first separated from the VR-adsorber and at this time the first relief gas of the TR-adsorber is drawn off from the TR-adsorber, by a corresponding valve switching to another group of TR and VR adsorbers in the counter current and is fed for the simultaneous pressure build up to this adsorber group. Thereby, the pressure of product gas is reduced to an intermediary pressure between the same and the remainder gas pressure, while in the adsorber group which is in the stage of pressure build up due to pressure equalization the pressure of remaining gas pressure is increased to a pressure above the same. After completing this first pressure relief phase the relieved TR-adsorber is closed at both sides and remains idle for a short time. Simultaneously with the first pressure relief phase of the TR-adsorber and its subsequent idle time the associated VR-adsorber runs at first through a counter flow pressure relief phase with discharge of the desorption gas into the remaining gas line and subsequently into a rinsing phase with foreign gas in the counter flow. For this purpose a foreign gas line is provided in FIG. 1, not shown in detail. Any gas can be used as the foreign gas which is adsorbed more weakly on the used adsorption agent than the adsorbed components of the crude gas in the VR-adsorbers; for example, a foreign gas may be used which consists of the gas components adsorbed in the TR-adsorbers, if it is available at a reasonable price. The VR-adsorber should be at remaining gas pressure before the start of the foreign gas rinsing. After finishing the foreign gas rinsing, the associated TR- and VR adsorbers are again reconnected with each other (valve 3), so that the pressure in the TR-adsorber can be also lowered to a remaining gas pressure; the pressure relief gas which thereby discharges in the counter flow through the VR-adsorber results in a further rinsing of the VR-adsorber, since it already is at a remaining gas pressure. Subsequently both associated TR-and VR-adsorbers are rinsed in the counter flow with product gas and the rinsing gas discharges through the remaining gas line. The subsequent pressure build up occurs in two phases, whereby in the first phase a pressure build up is performed due to pressure balance in the counter flow with the first pressure relief gas from a TR-adsorber as described above. The remaining pressure build up occurs as described in the two aforementioned examples in the counter flow with product gas. The other adsorber groups are operated in a cycle in a corresponding manner.

Hydrogen is generated in the aforedescribed manner from a crude gas with the composition as in example 2 at a product gas pressure of 17 bar. The adsorption of CO, CH$_4$ and CO$_2$ is carried out as in the two aforementioned examples. The adsorbers are designed for a volume throughput of 10 m$^3$/h (i.N) of the crude gas in the following manner:

Adsorber TR 1 to 4: 0.011 m$^3$ adsorption agent volume.

Adsorber VR 1 to 4: 0.014 m$^3$ adsorption agent volume.

Adsorption agent as in Examples 2 and 3.

Product gas is generated with a volume of 99.9 volume % during the operation of this installation at a crude gas throughput of 10 m$^3$/h (i.N) 5.14 m$^3$ (i.N). A rinsing gas quantity of 1.20 m$^3$/h nitrogen (as foreign gas) with a purity of over 99.0% is required. The remaining gas is composed of 2.15 volume-% CO$_2$, 31.35 volume-% N$_2$, 14.19 volume-% H$_2$, 9.90 volume-% CO and 42.41 volume-% CH$_4$. The remaining gas volume flow is 6.06 m$^3$/h (i.N).

EXAMPLE 5

The adsorption phase is again carried out in the same manner as in examples 2 to 4. In the following regeneration phase the given TR-adsorber runs through a two phase and the associated VR-adsorber through a one phase pressure relief. In the first pressure relief phase, the TR-adsorber is separated from the VR-adsorber (valve 3). Thereby, the TR-adsorber is relieved in the counter flow to a pressure between product gas and remaining gas pressure, whereby the pressure relief gas is used for the counter flow pressure build up of another adsorber group consisting of TR and VR adsorbers switched consecutively (as in example 4). During this first gas relief phase the given VR-adsorber is relieved in the counter flow through the remaining gas line to a remaining gas pressure. In the subsequent second pressure relief phase the associated VR- and TR-adsorbers are again reconnected (valve 3) and the further pressure relief is carried out in the counter flow to the remaining gas line; thereby the VR-adsorber is again rinsed from the associated TR-adsorber by means of the pressure relief gas (see example 4). The subsequent product gas rinsing and the pressure build up occur as in example 4. Hence, this example differs from example 4 by the foreign gas rinsing of the VR-adsorber and the idle phase of the TR-adsorber during this time.

Hydrogen is recovered in the aforementioned manner from a crude gas with the composition as in example 2 with a product gas pressure of 17 bar. The test conditions are otherwise identical with example 4.

Product gas is generated with a 99.9 volume-% H$_2$ during the operation of this installation at a crude gas throughput of 10 m$^3$/h (i.N.) 5.09 m$^3$/h (i.N). The remaining gas is composed of 2.65 volume-% CO$_2$, 14.26 volume-% N$_2$, 18.53 volume-% H$_2$, 12.22 volume-% CO ad 52.34 volume-% CH$_4$. The remaining gas volume flow is 4.91 m$^3$/h (i.N).

COMPARISON EXAMPLE WITH RESPECT TO EXAMPLES 2 to 5

Hydrogen is recovered in a pressure changing installation which consists of four parallel switched adsorbers by means of a crude gas consisting of 60 volume-% H$_2$, 1.3 volume-% CO, 7.0 volume-% N$_2$, 6.0 volume-% CO and 25.7 volume-% CH$_4$ at a gas pressure of 17 bar. The circuit of the adsorbers with the four phases adsorption, relieve, rinsing and pressure build up corresponds to the one described by K. Knoblauch, J. Reichenberger,: Pressure change method for gas separation, Haus der Technik, Vortragsveroeffentlichungen, volume 404, Vulkan Verlag Essen 1978, i.e., that after the carried out direct flow adsorption both adsorbers (VR and TR) are relieved consecutively in the counter flow and are rinsed in the counter flow with product gas for 500 seconds, before the counter flow pressure build up starts with product gas. Thereby, the remaining gas pressure is at 1 bar. The adsorbers are designed for an adsorption agent volume of 0.025 m³ each for a volume throughput of 10 m³/h (i.N) of the crude gas. The adsorbers are filled with a carbon molecular sieve. This has a specific surface (defined by Brunauer, Emmett and Teller) of about 1,100 m²/g (as in the inventive examples).

Hydrogen with a purity of 99.9% as a product gas are generated during the operation of this installation with a crude gas throughput of 10 m³/h (i.N.), 4.98 m³/h (i.N.). The remaining gas is composed of 2.59 volume-% $CO_2$, 13.94 volume-% $N_2$, 20.32 volume-% $H_2$, 11.95 volume-% CO and 51.2 volume-% $CH_4$. The remaining gas volume flow is 5.02 m³/h (i.N.).

We claim:

1. A method for separating gas mixtures by means of pressure changing techniques in a two stage absorption reactor consisting of a prefilter and a separation reactor by direct flow loading of the adsorption reactor at increased pressure wherein at least higher hydrocarbon aromatics and naphthenes present in the mixture are adsorbed in the prefilter and the remaining undesired gas components are adsorbed in the separation reactor whereby the product gas is discharged at the end of the separation filter which comprises
   (a) completing the adsorption process before the prefilter and separation reactor are disconnected;
   (b) partially reducing the gas pressures in the prefilter and separation reactor using direct and counter current gas flows respectively before reconnecting the prefilter and separation reactor;
   (c) after said reconnection when necessary again reducing the gas pressures in said prefilter and separation reactor employing counter flow of gas;
   (d) thereafter rinsing the prefilter and separation reactor employing counter flow of rinsing gas; and
   (e) thereafter increasing the gas pressures in the rinsed prefilter and separation reactor to reach load pressures using direct and counter gas flow respectively.

2. The method of claim 1 wherein a portion of the rinsing gas is fed between the prefilter and the separation reactor and is employed in counter flow rinsing of the prefilter before the prefilter is reconnected to the separation reactor.

3. Method in accordance with claim 1 or 2 which comprises that at least one part of the flow of relief gas in the separating reactor is used for the counter current flow rinsing of the separating reactor and the prefilter.

4. Method in accordance with claim 1 or 2 characterized in that at least one part of the direct current relief gas in the separating reactor is used for at least a partial pressure buildup of the prefilter and the separating reactor in the counter flow.

5. Method in accordance with claim 1 or 2 characterized in that the product gas is used for at least a partial pressure build up of the prefilter and the separating reactor in the counter flow.

6. Method in accordance with claim 1 and 2, characterized by using initial gas mixture at least for the concluding pressure build up to change the pressure of the prefilter and the separating reactor.

7. Method in accordance with claim 1 or 2, characterized by the use of at least four two stage adsorption reactors with known connecting lines and valves for the coupling of the individual method steps.

8. Method in accordance with claim 1 or 2 wherein after the adsorption process in the prefilter and separation reactor is completed and the prefilter and reactor are disconnected about 1/50 and ½ of the total relief time is utilized in counter flow within the reactor and/or prefilter and that the relief gas or gases are used for a partial rinsing stage of the prefilter and/or reactor.

* * * * *